June 25, 1968  E. R. POLAND  3,389,472
HOLE-CENTERING ADAPTER
Filed Sept. 9, 1966
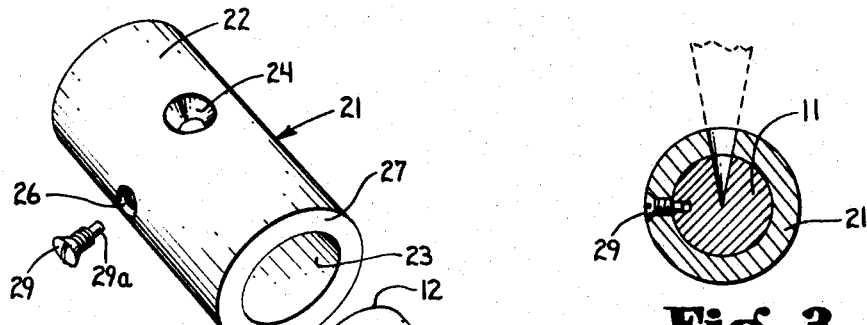
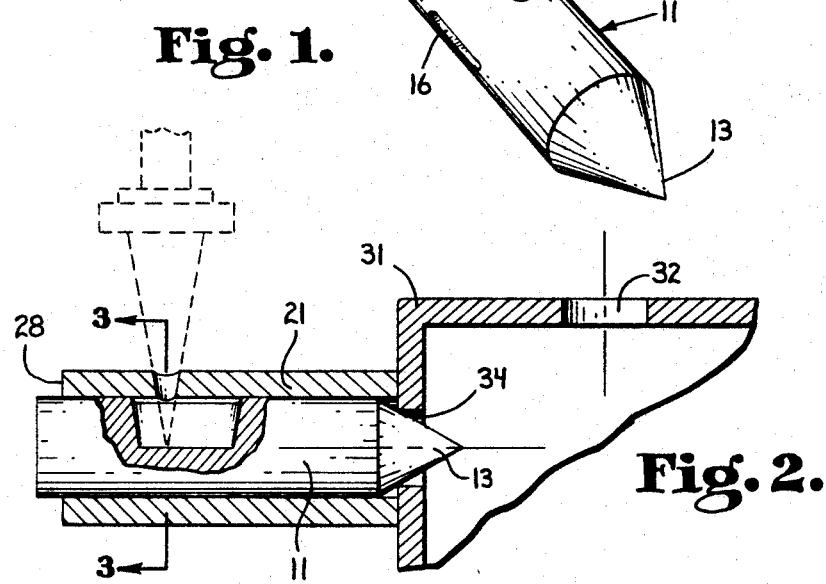
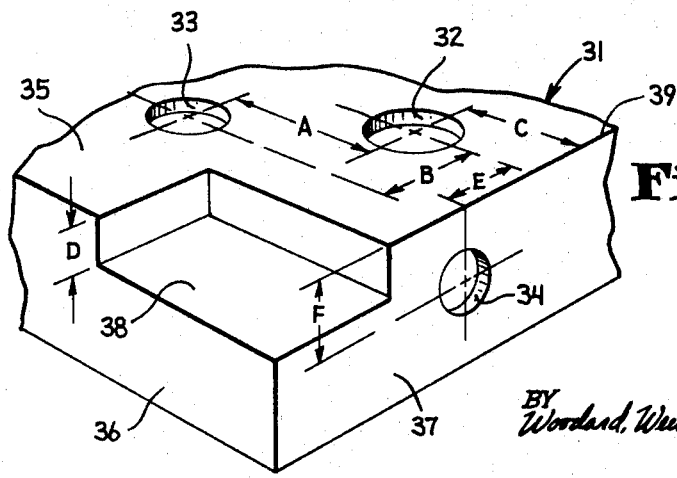
INVENTOR
ELMER R. POLAND 
United States Patent Office 3,389,472
Patented June 25, 1968

3,389,472
HOLE-CENTERING ADAPTER
Elmer R. Poland, 843 W. 5th St.,
Greenfield, Ind. 46140
Filed Sept. 9, 1966, Ser. No. 578,395
6 Claims. (Cl. 33—174)

ABSTRACT OF THE DISCLOSURE

A hole-centering adapter for locating and extending the centerlines of holes oriented perpendicularly to the stylus of a two- or three-dimensional coordinate measuring machine, the hole-centering adapter having a plunger with a tapered end portion symmetrical about a major axis, a sleeve within which the plunger is slidable parallel to the major axis and which has a face perpendicular to the major axis, a tapered groove in the plunger perpendicular to the major axis for receiving the stylus of the coordinate measuring machine and positioning the point of the stylus on the major axis and a tapered opening in the sleeve so that the stylus may pass therethrough and enter the tapered groove in the plunger.

---

This invention relates generally to measuring devices, and more particularly to a hole-centering adapter for use with a two- or three-dimensional coordinate machine.

Two- and three-dimensional measuring devices are commonly used to check the location of holes, bosses, etc. on metal work in process. The existing measuring devices generally employ a stylus supported on an arm, which is in turn coupled to other arms or shafts, and ultimately to calibrated members, sometimes located on the arms of the device, upon which the coordinate distances between two points in two- or three-dimensional space may be read in orthogonal components. Due to the basic design of many of these measuring devices, there are inherent limitations in their ability to measure certain distances upon and around the surface of three-dimensional objects.

Because of these limitations, it is necessary when using such a measuring device, to remove the work being measured from the means which are used to hold it stationary while the measurements are being made, rotate it or turn it so that another face or side is exposed to the measuring device's stylus, refasten the work so that further measurements may be made, and then proceed to measure the distances which were incapable of being measured with the work in its first position.

Even with the time-consuming step of removing and refastening the work in a different position, there are some measurements that cannot be made accurately.

It is therefore an object of this invention to provide an adapter which will permit standard two- and three-dimensional measuring devices to be used to measure distances which are presently beyond their capabilities.

It is a further object of this invention to provide such an adapter that will permit the measurement of the above mentioned additional distances with the same degree of accuracy with which the measuring device makes those measurements of which it is capable of measuring.

It is a further object of this invention to provide an adapter which will eliminate or reduce the number of times that work must be repositioned in order to make all necessary measurements upon the work, thereby accordingly reducing the chance for errors and decreasing the time and cost of making said measurements.

These and other objects of the invention will become more apparent upon a reading of the following brief specification, considered and interpreted in the light of the accompanying drawings, wherein:

FIG. 1 is an exploded perspective view of the adapter showing the relative relationship between its components parts, FIG. 2 is a sectional side elevation of the adapter positioned to measure the location of a hole in a metal chassis, FIG. 3 is a sectional end elevation of the adapter taken along the line 3—3 of FIG. 2, FIG. 4 shows a portion of a metal chassis and certain dimensions thereon.

Referring to the drawings, in the preferred embodiment, the plunger 11 is generally right circular cylindrical in shape and has a blunt end 12 and a pointed end 13, and is provided with grooves 14 and 16. The pointed end 13 is right circular conical about the major axis as is the cylindrical portion of the plunger.

The sleeve 21 is right circular cylindrical in shape and hollow, has an outer lateral surface 22 and an inner lateral surface 23, and has end faces 27 and 28, and holes 24 and 26. The outer lateral surface 22 and the inner lateral surface 23 are concentric about the axis of the sleeve. Means are provided to orient the major axis perpendicularly to the surface of the object being measured, such as faces 27 and 28 perpendicular to the major axis. The holes 24 and 26 are radially perpendicular to the axis of the sleeve and are located nearer to the end face 28 than to the end face 27.

Assembled, the plunger 11 fits slidably within the sleeve 21 and is oriented such that the hole 24 is in register with the groove 14 and the hole 26 is in register with the groove 16.

The hole 26 is tapped to receive threadedly the set screw 29 and the groove 16 slidably accommodates the extended portion 29a of the set screw, and while permitting the plunger to slide within the limits of the groove 16, prevents the plunger from rotating within the sleeve, or from falling out of the sleeve.

The hole 24 is tapered to accommodate the stylus (shown in dashed lines in FIGS. 2 and 3) of the coordinate machine with which the adapter is intended to be used. The groove 14 has sidewalls similarly tapered to tangentially accommodate the stylus, the taper of the sidewalls of the groove 14 being a continuation of the taper of the hole 24. The groove 14 is so cut in the plunger 11 that the bottom of the groove 14 lies along the major axis, so that when the stylus of the coordinate machine is inserted through the hole 24 into the groove 14, the point of the stylus will come to rest on the major axis.

Referring to FIG. 4, to measure the distances A and B on a two- or three-dimensional coordinate machine, the stylus of the machine is inserted first into the hole 32 or 33, and the machine zeroed. The stylus is then lifted from the first hole and inserted in the second hole, and the machine indicates the distances A and B. On a three dimensional coordinate machine, it is also possible to measure the distance D by first placing the point of the stylus on the surface 35, zeroing the machine, and then placing the stylus on the surface 38. On either a two- or three-dimensional coordinate machine, the distance C may be measured by placing the point of the stylus on the edge 39, zeroing the machine, and then inserting the stylus in the hole 32.

It should be noted that with either the two- or three-dimensional coordinate machine it is impossible without the hole-centering adapter to measure the distances E or F unless the chassis is turned or rotated. To measure the distance E, the stylus of the coordinate machine would first be inserted in the hole 32 as far as it would go. This would center the stylus in the hole 32. The coordinate machine is then zeroed. The hole centering adapter is then grasped in one hand and the face 27 brought near the hole 34. While applying pressure on the blunt end 12 of the plunger, the pointed end 13 of the plunger is inserted into the hole 34 with the hole 24 in the sleeve oriented vertically. While keeping the pointed end 13 of the plunger inserted as far as it will go into the hole 34, the sleeve 21 is allowed to slide toward the hole 34 until the face 27 or other means affixed to the sleeve is contacting the vertical face 37 of the chassis. With the hole-centering adapter held in this position, the major axis is centered in the hole by the axially symmetrical taper of the pointed end 13 of the plunger and also held perpendicular to the vertical face 37 of the chassis. The hole-centering adapter thus effectively extends the center line of the hole 34 along the major axis to a point in space accessible by the machine stylus. The machine stylus is then lifted with the other hand from the hole 32 where it rested when the machine was zeroed, and is inserted through the hole 24 in the hole centering adapter sleeve into the groove 14. Slight rotation of the hole-centering adapter in hole 34 of the chassis may be necessary to permit the machine stylus to fully seat within the tapered hole 24 and groove 14. When the machine stylus is fully seated in the hole-centering adapter, its point rests on the extended center line of the hole 34, and the dimension E may then be read directly on the coordinate machine.

The dimension F may be similarly measured, but instead of zeroing the machine with the stylus resting in hole 32, the stylus is rested on the horizontal surface 35 of the chassis and zeroed. Once this is done, the remainder of the steps are the same as in measuring dimension E as described above.

It should be noted that the hole-centering adapter of this invention is not limited to use on only one vertical face of a piece of work being measured, but may be used on all vertical faces without repositioning the work. The location of a hole in face 36 of the chassis can be as easily measured as was the location of the hole 34 in face 37.

While the invention has been disclosed and described in some detail in the drawings and foregoing description, they are to be considered as illustrative and not restrictive in character as other modifications may readily suggest themselves to persons skilled in this art and within the broad scope of the invention, reference being had to the appended claims. For example, the sleeve and the body of the plunger may be of polygonal rather than circular cross section, or the plunger may extend sufficiently beyond the sleeve so that the stylus of the coordinate machine need not pass through the sleeve to be positioned on the major axis.

The invention claimed is:

1. A hole-centering adapter for use with coordinate measuring machines which utilize a stylus comprising:
   a plunger which has a body portion and a tapered end portion,
   the tapered end portion being symmetrical about the major axis of said body portion,
   means coupled to the plunger and cooperable with an object being measured to orient the major axis of said body portion perpendicular to a surface on said object being measured, and
   means on said plunger cooperable with the stylus to orient the major axis of said body portion perpendicularly to the axis of the stylus and to position the point of the stylus upon the major axis.

2. The device of claim 1 wherein the means coupled to the plunger to orient the major axis perpendicular to a surface on an object being measured includes a sleeve within which the plunger slidably communicates in a direction parallel to the major axis of said body portion, an end face of the sleeve being perpendicular to the major axis.

3. The device of claim 1 wherein the means cooperable with the stylus to orient the major axis perpendicular to the axis of the stylus and to position the point of he stylus upon the major axis includes a sleeve within which the plunger slidably communicates in a direction parallel to the major axis of said body portion, there being a hole in the sleeve contoured to receive the stylus and a groove in the plunger having sidewalls contoured to tangentially communicate with the stylus, said hole and said groove being so oriented that when the stylus is fully inserted into said hole and groove the point of the stylus is positioned upon the major axis.

4. The device of claim 3 wherein the sleeve is right circular cylindrical, the body of the plunger is right circular cylindrical, and the device further includes means to prevent the rotation of the plunger within the sleeve.

5. The device of claim 4 wherein the means to prevent the rotation of the plunger within the sleeve comprises a hole in the sleeve, a set screw with an extended end portion, and an axial groove in the plunger, the hole being threaded to receive the set screw and the groove slidably receiving the extended end portion of the set screw.

6. The device of claim 1 wherein the body portion of the plunger is right circular cylindrical and the tapered end portion of the plunger is right circular conical, the body portion and the tapered end portion being co-axial about the major axis, and wherein the means coupled to the plunger to orient the major axis perpendicular to a surface on an object being measured includes a right circular cylindrical sleeve within which the plunger slidably communicates in a direction parallel to the major axis, an end face of the sleeve being perpendicular to the major axis, and wherein the means cooperable with the stylus to orient the major axis perpendicular to the axis of the stylus and to position the point of the stylus upon the major axis includes a hole in the sleeve contoured to receive the stylus, and a groove in the plunger having sidewalls contoured to tangentially communicate with the stylus, said hole and said groove being so oriented that when the stylus is fully inserted into said hole and groove the point of the stylus is positioned on the major axis.

References Cited

UNITED STATES PATENTS

| | | | |
|---|---|---|---|
| 2,470,458 | 5/1949 | Barr | 33—180 |
| 2,718,708 | 9/1955 | Kalberer | 33—189 |
| 2,727,313 | 12/1955 | Wonders | 33—174 |
| 3,186,098 | 6/1965 | Fleck | 33—189 |

SAMUEL S. MATTHEWS, *Primary Examiner.*